United States Patent
Shy et al.

(10) Patent No.: US 7,030,934 B2
(45) Date of Patent: Apr. 18, 2006

(54) VIDEO SYSTEM FOR COMBINING MULTIPLE VIDEO SIGNALS ON A SINGLE DISPLAY

(75) Inventors: Shing-Jong Shy, Jubei (TW); Biao Zhang, Sunnyvale, CA (US)

(73) Assignee: Huaya Microelectronics, Ltd., San Jose, CA (US)

( * ) Notice: Subject to any disclaimer, the term of this patent is extended or adjusted under 35 U.S.C. 154(b) by 552 days.

(21) Appl. No.: 10/274,492

(22) Filed: Oct. 18, 2002

(65) Prior Publication Data

US 2004/0075769 A1    Apr. 22, 2004

(51) Int. Cl.
*H04N 5/46* (2006.01)

(52) U.S. Cl. .................. 348/584; 348/598; 348/581; 348/564; 348/555; 382/299

(58) Field of Classification Search .......... 348/584, 348/598, 588, 555, 556, 554, 564, 565, 705, 348/704, 558, 580, 581; 382/284, 298, 299
See application file for complete search history.

(56) References Cited

U.S. PATENT DOCUMENTS

| | | | | |
|---|---|---|---|---|
| 5,109,279 A | * | 4/1992 | Ando ........................ | 348/564 |
| 5,847,770 A | * | 12/1998 | Yagasaki .................... | 348/563 |
| 5,875,000 A | * | 2/1999 | Yamaguchi ................. | 348/563 |
| 5,969,769 A | * | 10/1999 | Hamadate ................... | 348/568 |
| 6,046,777 A | * | 4/2000 | Patton et al. ............... | 348/565 |
| 6,356,313 B1 | * | 3/2002 | Champion et al. ......... | 348/558 |
| 6,356,314 B1 | * | 3/2002 | Takebe ....................... | 348/564 |
| 6,384,868 B1 | * | 5/2002 | Oguma ....................... | 348/564 |
| 6,449,018 B1 | * | 9/2002 | Yokoyama .................. | 348/565 |
| 6,459,456 B1 | * | 10/2002 | Oh ............................. | 348/564 |

* cited by examiner

*Primary Examiner*—John Miller
*Assistant Examiner*—Jean W. Désir
(74) *Attorney, Agent, or Firm*—Silicon Valley Patent Group; Edward S. Mao

(57) ABSTRACT

A video system and method for combining multiple video signals on a single display is provided. The video system includes a video processor to process a second video signal and generate a processed video signal. The processed video signal has the same resolution and scan rates as a first video signal. A multiplexer is used to selectively display either the processed video signal or the first video signal on a display.

26 Claims, 6 Drawing Sheets

VIDEO SYSTEM FOR COMBINING MULTIPLE VIDEO SIGNALS ON A SINGLE DISPLAY

BACKGROUND OF THE INVENTION

1. Field of the Invention

The present invention relates to video systems. More specifically, the present invention relates to methods and circuits for displaying multiple video signals on a single display.

2. Discussion of Related Art

Analog video displays such as cathode ray tubes (CRTs) dominate the video display market. Thus, most electronic devices that require video displays, such as computers and digital video disk players, output analog video signals. As is well known in the art, an analog video display sequentially reproduces a large number of still images to give the illusion of full motion video. Each still image is known as a frame. For NTSC television, 30 frames are displayed in one second. For computer applications, the number of frames per seconds is variable with typical values ranging from 56 to 100 frames per seconds.

FIG. 1(a) illustrates a typical analog video display 100. Analog video display 100 comprises a raster scan unit 110 and a screen 120. Raster scan unit 110 generates an electron beam 111 in accordance with an analog video signal VS, and directs electron beam 111 against screen 120 in the form of sequentially-produced horizontal scanlines 101–109, which collectively form one frame. Screen 120 is provided with a phosphorescent material that is illuminated in accordance with the video signal VS transmitted in electron beam 111 to produce contrasting bright and dark regions that create an image, such as the diamond shape shown in FIG. 1(a). After drawing each scanline 101–108, raster scan unit 110 performs a horizontal flyback 130 to the left side of screen 120 before beginning a subsequent scanline. Similarly, after drawing the last scanline 109 of each frame, raster scan unit 110 performs a vertical flyback 131 to the top left corner of screen 120 before beginning a subsequent frame. To avoid generating an unwanted flyback traces (lines) on screen 120 during horizontal flyback 130, video signal 130 includes a horizontal blanking pulse that turn off electron beam 111 during horizontal flyback 130. Similarly, during vertical flyback 135, video signal VS includes a vertical blanking pulse that turns off electron beam 111 during vertical flyback 135.

FIG. 1(b) illustrates a typical analog video signal VS for analog video display 100. Video signal VS is accompanied by a horizontal synchronization signal HSYNC and a vertical synchronization signal VSYNC (not shown). Vertical synchronization signal VSYNC contains vertical sync marks to indicate the beginning of each new frame. Typically, vertical synchronization signal VSYNC is logic high and each vertical sync mark is a logic low pulse. Horizontal synchronization signal HSYNC contains horizontal sync marks (logic low pulses) 133, 134, and 135 to indicate the beginning of data for a new scanline. Specifically, horizontal sync mark 133 indicates video signal VS contains data for scanline 103; horizontal sync mark 134 indicates video signal VS now contains data for scanline 104; and horizontal sync mark 135 indicates video signal VS now contains data for scanline 105.

Video signal VS comprises data portions 112, 113, 114, and 115 that correspond to scanlines 102, 103, 104, and 105, respectively. Video signal VS also comprises horizontal blanking pulses 123, 124 and 125, each of which is located between two data portions. As explained above, horizontal blanking pulses 123, 124, and 125 prevent the electron beam from drawing unwanted flyback traces on analog video display 100. Each horizontal blanking pulse comprises a front porch FP, which precedes a horizontal sync mark, and a back porch BP, which follows the horizontal sync mark. Thus, the actual video data for each row in video signal VS lies between the back porch of a first horizontal blanking pulse and the front porch of the next horizontal blanking pulse. In color video signals, color data is multiplexed with luminance information in the data portions of video signal VS.

Typically, video signal VS contains a luminance signal and two chrominance signals. The luminance signal, generally referred to as Y, corresponds to the brightness information for the image. The two chrominance signals, generally referred to as U and V, provide the color information. Multiplexed analog video signals are generally referred to as YUV format. However, some video signals, such as VGA, SVGA, XGA used in the computer industry use a red signal, a green signal and a blue signal. The individual color signals are combined into a composite video signal in RGB format.

In general, video displays used in the computer industry have much higher resolution and refresh rates than video display units used in the entertainment industry. Thus, most video display units for computers are incompatible with video signals used in for television or other entertainment industry devices such as DVD players and video-cassette recorders (VCRs). Similarly, most televisions are incompatible with computers. However, as the size of video display units used by computers has increased, computer users have a desire to use the video display units to display multiple video signals to reduce the cost and space required for having a separate video display unit for different type of video signals. Furthermore, many users have a desire to be able to watch multiple video signals simultaneously. For example, FIG. 2 illustrates a video display unit 210 being used to simultaneously display a first analog video signal AVS1 and a second analog video signal AVS2. Specifically, video display unit 210 includes a display screen 212, which is used to display images from first analog video signal AVS1, which could be generated by a computer for example. Superimposed within the images on display screen 110 is a picture-in-picture (PIP) window 120. PIP window 120 includes images from second analog video signal AVS2, which could be generated by a DVD player for example. In general, PIP window 120 is used for the lower resolution video signal.

As explained above, video display unit 210 is generally compatible with only a limited number of video signal formats. Thus to use video display unit 210 for both first analog video signal AVS1 and second analog video signal AVS2, a video system 220 is used to combine first analog video signal AVS1 and second analog video signal AVS2 into a combined analog video signal CAVS, which has a format compatible with video display unit 210.

FIG. 3, shows a simplified block diagram of a conventional video system 300, which can be used to combine first analog video signal AVS1 and second analog video signal AVS2 to form combined video signal CAVS. Video system 300 includes a analog to digital converter 310, a video scaler 320, an analog to digital converter 330, a digital frame buffer 340 and a digital to analog converter 350. Analog to digital converter 330 converts first analog video signal AVS1 into a first digital video signal DVS1. In digital form, each image within digital video signal DVS1 is a two-dimensional array of pixels which correspond to display screen 212 (FIG. 2).

These pixels are stored in digital frame buffer 340, except for the pixels which would correspond with PIP window 214 (FIG. 2).

Analog to digital converter 310 converts second analog video signal AVS2 into a second digital video signal DVS2. Video scaler 320 processes second digital video signal DVS2 to produce scaled digital video signal SDVS2. Video scaler 320 may also change the format of the video signal, for example for YUV format to RGB format. The images in digital video signal DVS2 are also a two-dimensional array of pixels and are scaled to fit in PIP WINDOW 214. The pixels forming the images of scaled digital video signal DVS2 are stored digital frame buffer 340 at locations corresponding with PIP window 214. The pixels in digital frame buffer 340 are combined to form a combined digital video signal CDVS, which includes the images originally from analog video signal AVS2 superimposed over the images originally from analog video signal AVS1. Digital to analog converter 350 converts combined digital video signal CDVS into a combined analog video signal CAVS, which can be used with a video display unit, such as video display unit 210 (FIG. 2).

By processing the video signals in digital form, differing refresh rates and scan rates are easily remedied using digital frame buffer 340. Specifically, digital frame buffer 340 is made to have two independent write ports and one independent read port. Thus, pixels originating from analog video signal AVS1 can be written into digital frame buffer 340 at different rate than pixels originating from analog video signal AVS2. Furthermore, pixels can be read out of digital frame buffer 340 at yet another different rate if desired. However, for high resolution graphics digital frame buffer 340 must be very large and very fast and thus very expensive. The cost of the digital frame buffer 340 is further increased by the need for three independent ports. Hence, there is a need for a system or method to combine analog video signals without requiring an expensive digital frame buffer.

SUMMARY

The present invention combines two video signals to form a combined video signal using a multiplexer rather than an expensive digital frame buffer. In one embodiment of the present invention, the video system includes a multiplexer having a first input port, a second input port, a control port, and an output port. The first input port receives a first video signal and the output port provides a combined video signal for a video display system. The video system also includes a video processor, which receives a second video signal and generates a processed video signal and a switch signal. The processed video signal is applied to the second input port of the multiplexer and the switch signal is applied to the control port of the multiplexer. When the switch signal is in a first logic state, for example logic high, the multiplexer drives the first video signal as the combined video signal. However, when the switch signal is in a second logic state, for example logic low, the multiplexer drives the processed video signal as the combined video signal.

In general the first video signal and the second video signal may have different resolutions, vertical scan rates, and horizontal scan rates. However the video processor creates the processed video signal to have the same horizontal scan rate, resolution, and vertical scan rate as the first video signal. A pixel clock generator is configured to provide a pixel clock signal to the video processor based on the horizontal sync signal of the first video signal and a pixel count.

In one embodiment of the present invention the video processor of the video system includes an analog to digital converter, a scaler, and a digital to analog converter. The analog to digital converter converts the second video signal to a digital video signal. The scaler can be used to resize the images within the digital video signal and to pad the images of the digital video signal to generate a processed video signal with images having the same resolution as the images of the first video signal. Furthermore, the scan rates of the processed video signal are the same as the scan rates of the first video signal.

The present invention will be more fully understood in view of the following description and drawings.

DETAILED DESCRIPTION

Figure 2:
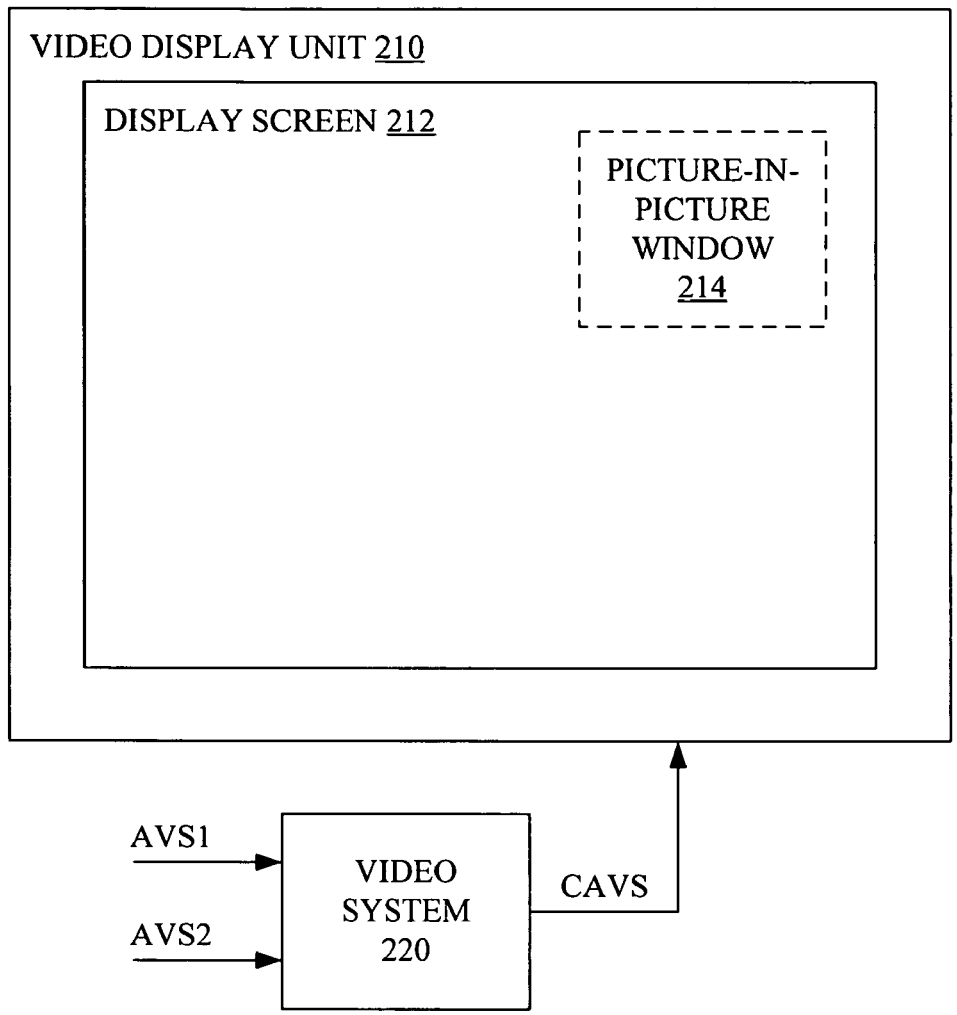
FIG. 2 is diagram of a video display unit simultaneously displaying data from two video signals.
Figure 3:
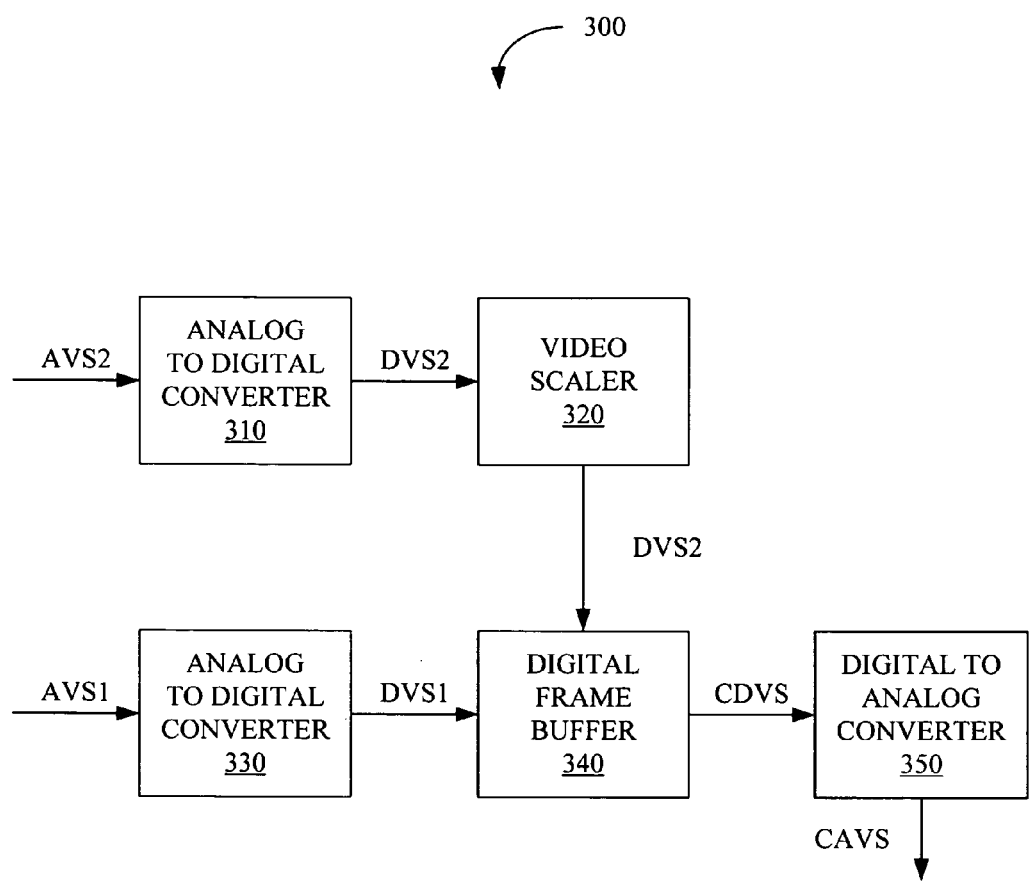
FIG. 3 is a simplified block diagram of a conventional video system for combining two video signals.
Figure 4:
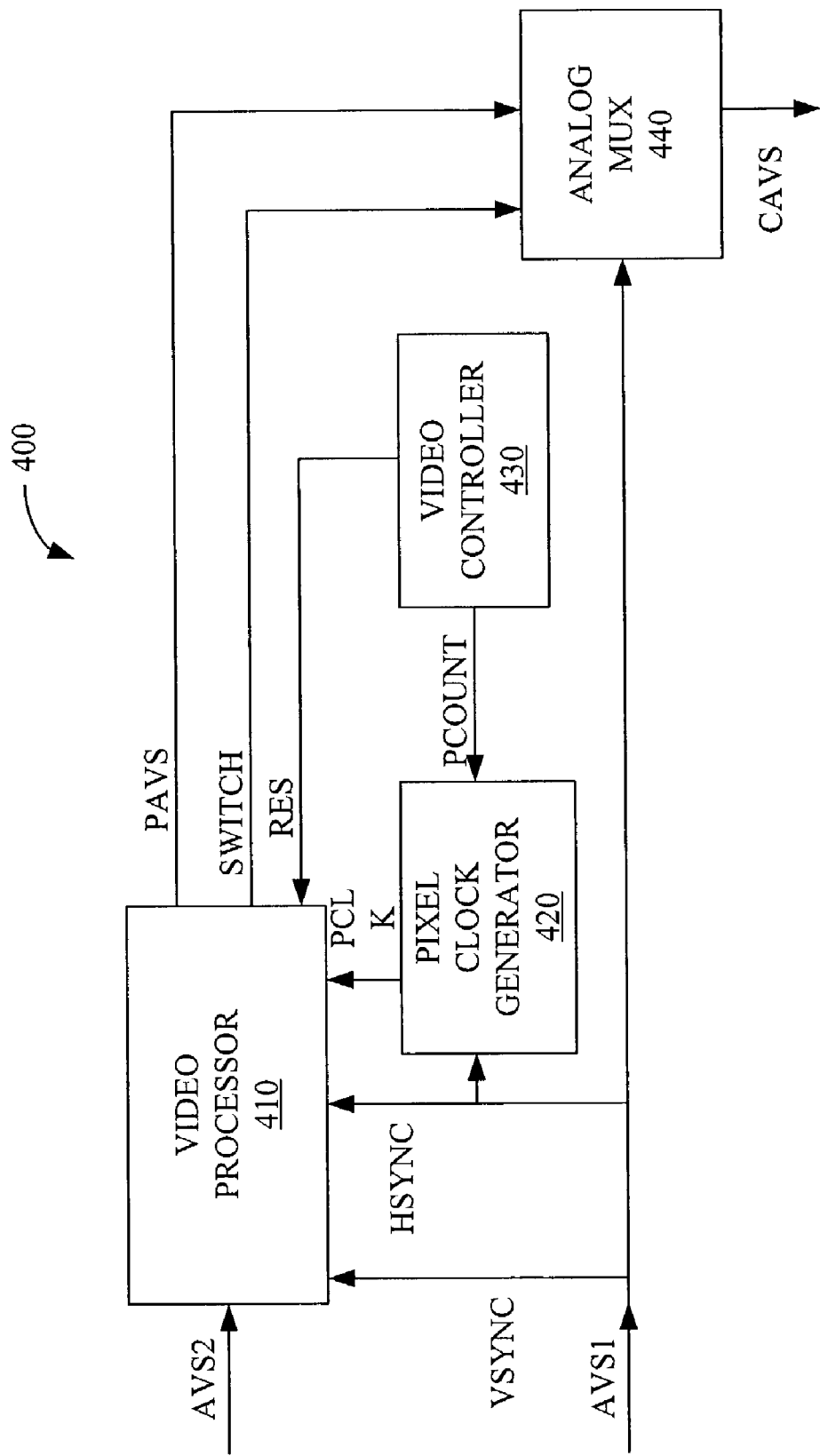
FIG. 4 is a simplified block diagram of a novel video system for combining two analog video signals.

As explained above, conventional methods of combining analog video signals require using an expensive digital frame buffer. FIG. 4 is a novel video system 400 which can combine a first analog video signals AVS1 and a second analog video signal AVS2 into a combined analog video signal CAVS without using a digital frame buffer. Video system 400 includes a video processor 410, a pixel clock generator 420, a video controller 430, and an analog multiplexer (MUX) 440. For clarity, video system 400 is described with respect to combining video signals to have a PIP window as described above with respect to FIG. 2. However, the principles of the present invention can be used to combine video signals in a variety of different formats. For examples the principles of the present invention can be used to display a "split screen" having half the display showing first analog video signal and half the display showing the second analog video signal.

Figure 1A:
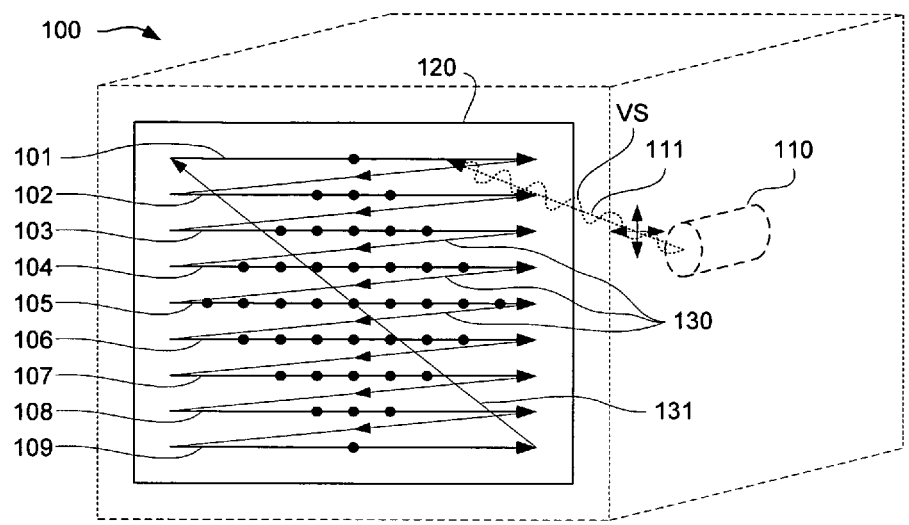
FIG. 1(a) is a simplified illustration of an analog video display.
Figure 1B:
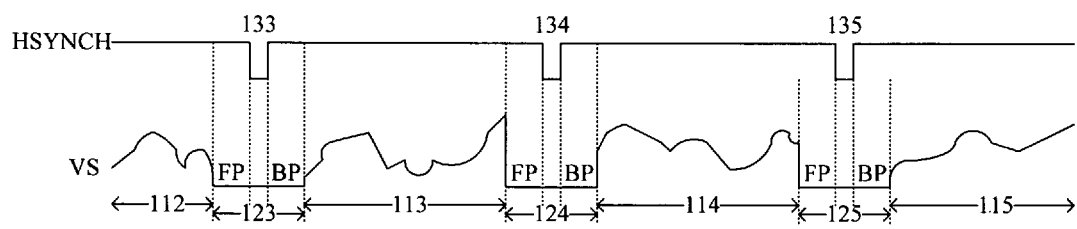
FIG. 1(b) is an analog video signal and a horizontal synchronization signal.

First analog video signal AVS1 is driven to a first input port of analog MUX 440. In addition horizontal synchronization signal HSYNC of first analog video signal AVS1 is driven to pixel clock generator 420 and video processor 410. Vertical synchronization signal VSYNC of first analog video signal AVS1 is also driven to video processor 410. Pixel clock generator 420 generates a pixel clock signal PCLK based on the horizontal sync signal HSYNC and a pixel count PCOUNT provided by video controller 430. Specifically, pixel clock signal PCLK divides the data portions (FIG. 1(b)) of analog video signal 420 into a number of pixels equal to pixel count PCOUNT. Generation of pixel clock signals is well known in the art and is not an integral part of the present invention. For example, pixel clock generator 420 can generate pixel clock signal PCLK using the systems and methods taught by Biao Zhang and Chin-Cheng Kau in U.S. Pat. No. 6,310,618 entitled "Clock Generation for Sampling Analog Video."

Second analog video signal AVS2 is processed by video processor 410 to generate a processed analog video signal PAVS. For picture-in-picture functions, the images in processed analog video signal PAVS are smaller than the images in analog video signal AVS1. The size of the images in processed video signal PAVS is controlled by resolution signal RES from video controller 430. Even with the differing image sizes, video processor 410 generates processed analog video signal PAVS to be synchronized with first analog video signal AVS1 using horizontal synchronization signal HSYNC and pixel clock signal PCLK. Thus, processed analog video signal PAVS and first analog video signal have the same refresh rate and equivalent horizontal scan rates. Processed analog video signal PAVS is driven to a second input port of analog MUX 440. Analog MUX 440, which is controlled by a switch signal SWITCH from video processor 410, provides combined analog video signal CAVS through an output port. Specifically, when switch signal SWITCH is in a first logic state, analog MUX 440 drives analog video signal AVS1 as combined analog video signal CAVS. When switch signal SWITCH is in a second logic state, analog MUX 440 drives processed analog video signal PAVS as combined analog video signal CAVS. Thus, for picture-in-picture operation, switch signal SWITCH is driven to the second logic state when the PIP window is displayed. Otherwise, switch signal SWITCH is driven to the first logic state. Some embodiments of video system 400 are implemented using discrete components. Other embodiments of video system 400 are implemented as a single integrated circuit.

Figure 5:
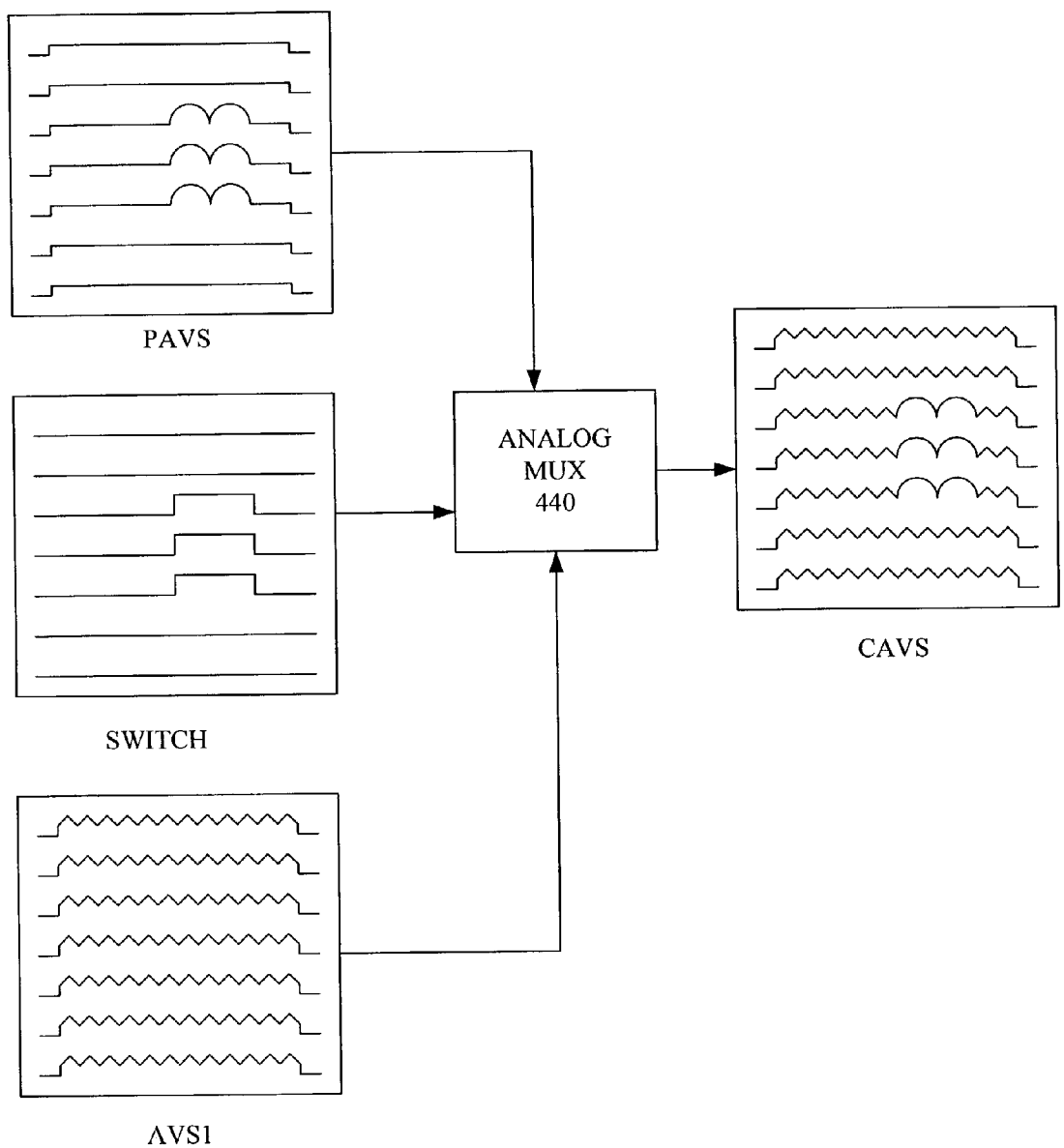
FIG. 5 illustrates the use of a video system for combining two analog video signals.

FIG. 5 illustrates combining a first analog video signal AVS1 with a second analog video signal AVS2, which is processed into a processed video signal PAVS, to form a combined video signal CAVS in accordance with one embodiment of the present invention. The image lines of analog video signal AVS1 are represented by triangular waveforms, while the image lines of analog video signal AVS2 are represented by curved waveforms. In the example of FIG. 5, the images of analog video signal AVS2 are smaller than the images of analog video signal AVS1. Video processor 410 converts analog video signal AVS2 into a processed analog video signal PAVS having the same image size, refresh rate and horizontal scan rate as analog video signal AVS1. The images of processed analog video signal PAVS includes padding as illustrated using flat waveforms around the image content of analog video signal AVS2 (as illustrated by curved waveforms). Processed analog video signal PAVS and analog video signal AVS1 are coupled to the input terminals of analog MUX 440. Analog MUX drives combined analog video signal CAVS. Analog MUX is controlled by a switch signal SWITCH. When switch signal SWITCH is at a first logic state (logic zero in FIG. 5), analog MUX 440 outputs analog video signal AVS1 as combined analog video signal CAVS. Conversely, when switch signal SWITCH is at a second logic state (logic one in FIG. 5), analog MUX 440 outputs processed video signal PAVS as combined analog video signal CAVS. Thus, as illustrated in FIG. 5, if switch signal SWITCH is aligned with processed analog video signal PAVS so that switch signal SWITCH is at the second logic state (i.e., logic one) when the images processed analog video signal PAVS contain data from analog video signal AVS2, then the images of combined analog video signal CAVS contains the images of analog video signal AVS2 within the images of analog video signal AVS1.

Figure 6:
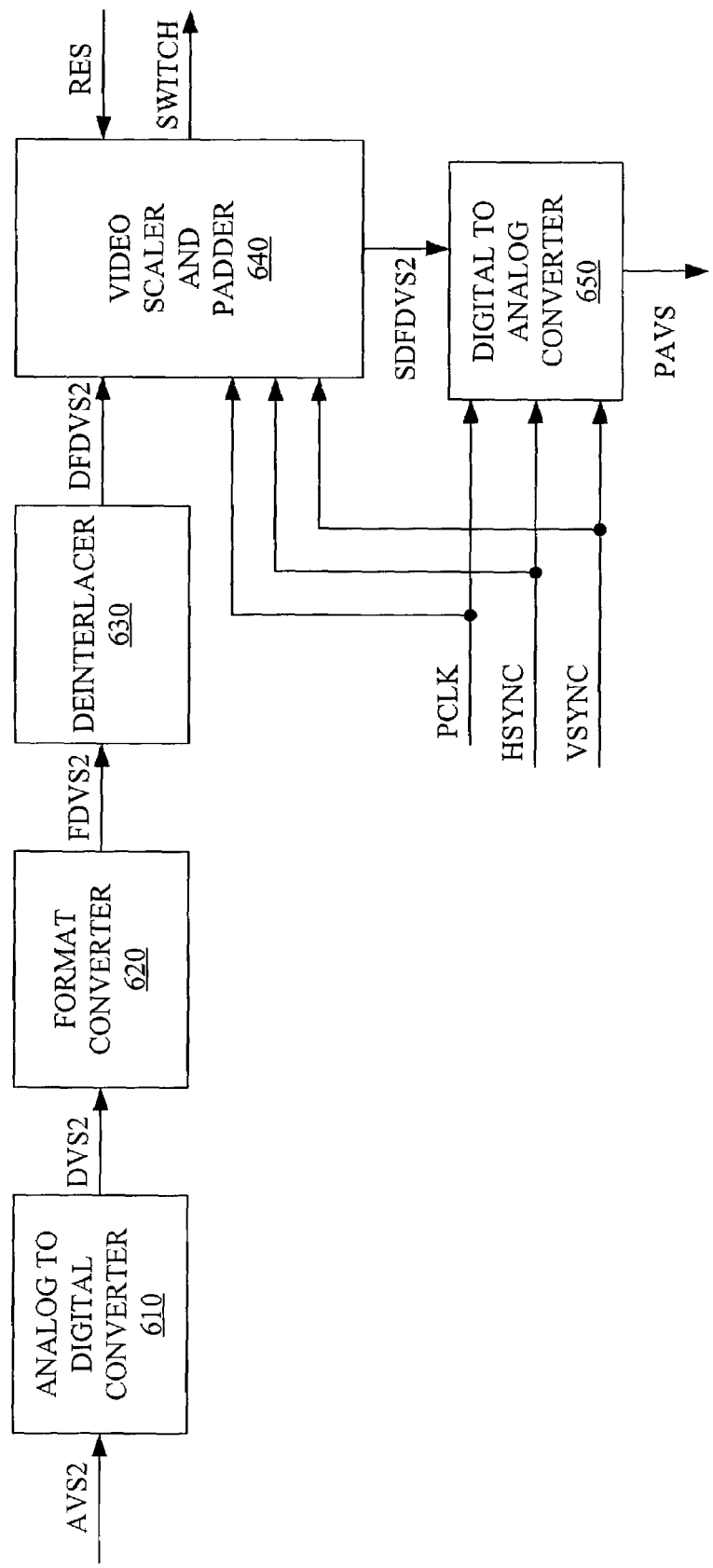
FIG. 6 is a simplified block diagram of a video processor used to scale and format a video system.

FIG. 6 is simplified block diagram of an embodiment of video processor 410 (FIG. 4). The embodiment of FIG. 6 includes an analog to digital converter 610, a format converter 620, a deinterlacer 630, a video scaler and padder 640, and a digital to analog converter 650. Analog to digital converter converts analog video signal AVS2 to a digital video signal DVS2. Then, if necessary, format converter 620 converts the format of digital video signal DVS2 to generate formatted digital video signal FDVS2. For example, format converter 620 may convert from RGB format to YUV format. Then, if necessary deinterlacer 630 deinterlaces formatted digital video signal FDVS2 to generate deinterlaced formatted digital video signal DFDVS2. Video scaler and padder 640 scales the images of deinterlaced formatted digital video signal DFDVS2 to the appropriate resolution as indicated by resolution signal RES from video controller 430 (FIG. 4). Furthermore, video scaler and padder 640 provides padding around the scaled images and outputs a scaled deinterlaced digital video signal SDFDVS2 having the same resolution as analog video signal AVS1. The embodiment of FIG. 6 uses pixel clock signal PCLK from pixel clock generator 420 and horizontal sync signal HSYNC and vertical sync signal VSYNC from analog video signal AVS1 to determine the appropriate amount of padding. Other embodiments may receive a second resolution signal, which provides the resolution of analog video signal AVS1. In addition video scaler and padder 640 generates switch signal SWITCH based on whether actual image data or pad data is present in scaled deinterlaced digital video signal SDFDVS2. Finally, digital to analog converter 650 convert deinterlaced digital video signal SDFDVS2 into processed analog video signal PAVS using pixel clock signal PCLK, vertical sync signal VSYNC, and horizontal sync signal HSYNC. Specifically, processed analog video signal PAVS should have the same resolution, scan rate, and refresh rate as analog video signal AVS1.

The various embodiments of the structures and methods of this invention that are described above are illustrative only of the principles of this invention and are not intended to limit the scope of the invention to the particular embodiments described. For example, in view of this disclosure, those skilled in the art can define other video systems, multiplexers, video signals, video processors, switch signals, refresh rates, scan rates, analog to digital converters, digital to analog converters, format converters, deinterlacers, pixel clock generators, video controllers, and so forth, and use these alternative features to create a method, circuit, or system according to the principles of this invention. Thus, the invention is limited only by the following claims.

We claim:

1. A video system for combining a first analog video signal with a second analog video system to generate a combined analog video signal, the video system comprising:
  a multiplexer having a first input port, a second input port, a control port, and an output port, wherein the first input port is coupled to receive the first analog video signal and the output port is configured to provide the combined analog video signal;
  a video processor coupled to receive the second analog video signal and to generate a processed analog video signal and a switch signal, wherein the video processor is configured
  to change the resolution of a plurality of images from the second analog video signal to form a plurality of scaled images;
  to pad the plurality of scaled images with pad data to form a plurality of padded images having a resolution equal to a resolution of a plurality of images in the first analog video signal; and
  to form the processed analog video signal with the plurality of padded images; and
wherein the switch signal is provided to the control port of the multiplexer and the processed analog video signal is provided to the second input port of the multiplexer.

2. The video system of claim 1, wherein the multiplexer drives the first analog video signal as the combined video signal when the switch signal is in a first state and wherein the multiplexer drives the processed analog video signal as the combined analog video when the switch signal is in a second state.

3. The video system of claim 1, wherein the processed analog video signal and the first analog video signal have the same horizontal scan rate.

4. The video system of claim 1, wherein the processed analog video signal and the first analog video signal have the same vertical scan rate.

5. The video system of claim 1, wherein the first analog video signal has a first resolution and the second analog video signal has a second resolution different from the first resolution.

6. The video system of claim 1, wherein the first analog video signal has a first vertical scan rate and the second analog video signal has a second vertical scan rate different from the first vertical scan rate.

7. The video system of claim 1, wherein the first analog video signal has a first horizontal scan rate and the second analog video signal has a second horizontal scan rate different from the first horizontal scan rate.

8. The video system of claim 1, further comprising a pixel clock generator configured to provide a pixel clock signal to the video processor.

9. The video system of claim 8, wherein the pixel clock generator generates the pixel clock signal based on the horizontal sync signal of the first analog video signal and a pixel count.

10. The video system of claim 1, wherein the video processor further comprises:
  an analog to digital converter coupled to convert the second analog video signal to a digital video signal; and
  a scaler configured to change the resolution of a plurality of images in the digital video signal to generate a scaled digital video signal.

11. The video system of claim 10, wherein the video processor further comprises a deinterlacer coupled between the analog to digital converter and the scaler.

12. The video system of claim 10, further comprising a format converter coupled between the analog to digital converter and the scaler.

13. The video system of claim 1, wherein an image of the combined analog video signal includes a scaled version of an image in the second analog video signal superimposed on an image of the first analog video signal.

14. The video system of claim 1, formed on a single integrated circuit.

15. The method of claim 1, wherein the video processor drives the switch signal to a first state when the processed video signal outputs image data and the video processor drives the switch signal to a second state when the processed video signal outputs pad data.

16. A method of combining a first analog video signal and a second analog video signal to form a combined video signal, the method comprising:
  processing the second analog video signal to form a processed video signal by
    scaling a plurality of images in the second analog video signal to form a plurality of scaled images;
    padding the plurality of images with pad data to form a plurality of padded images, wherein the plurality of padded images have a same resolution as a plurality of images in the first analog video signal; and
    forming the processed video signal using the plurality of padded images;
  generating a switch signal;
  driving the processed video signal as the combined video signal when the switch signal is in a first state; and
  driving the first analog video signal as the combined video signal when the switch signal is in a second state.

17. The method of claim 16 wherein the processing the second analog video signal to form a processed video signal, further comprises:
  synchronizing the processed video signal with the first analog video signal.

18. The method of claim 17, wherein the processing the second analog video signal to form a processed video signal, further comprises digitizing the second analog video signal.

19. The method of claim 16, wherein the processing the second analog video signal to form a processed video signal, further comprises deinterlacing the second analog video signal.

20. The method of claim 16, further comprising generating a pixel clock signal based on a horizontal sync signal of the first analog video signal.

21. The method of claim 16, wherein the processed analog video signal and the first analog video signal have the same vertical scan rate.

22. The method of claim 16, wherein the processed analog video signal and the first analog video signal have the same horizontal scan rate.

23. The method of claim 16, wherein the first analog video signal has a first resolution and the second analog video signal has a second resolution different from the first resolution.

24. The method of claim 16, wherein the first analog video signal has a first vertical scan rate and the second analog video signal has a second vertical scan rate different from the first vertical scan rate.

25. The method of claim 16, wherein the first analog video signal has a first horizontal scan rate and the second analog video signal has a second horizontal scan rate different from the first horizontal scan rate.

26. The method of claim 16, wherein the generating a switch signal further comprises:
  driving the switch signal to the first state when the processed video signal outputs pad data; and
  driving the switch signal to the second state when the processed video signal outputs image data.

* * * * *